United States Patent [19]

Shiba et al.

[11] 4,181,272
[45] Jan. 1, 1980

[54] TAPE CASSETTE REEL

[75] Inventors: Haruo Shiba; Masatoshi Okamura, both of Tokyo, Japan

[73] Assignee: TDK Electronics Company, Limited, Tokyo, Japan

[21] Appl. No.: 926,959

[22] Filed: Jul. 21, 1978

[51] Int. Cl.² .......................................... B65H 75/28
[52] U.S. Cl. ................................................ 242/74.1
[58] Field of Search ........................ 242/74, 74.1, 74.2

[56] References Cited
U.S. PATENT DOCUMENTS 3,661,345  5/1972  Ritz et al. ...................... 242/74.1 X
3,990,733  11/1976  Shiba et al. ...................... 242/74

Primary Examiner—John M. Jillions
Attorney, Agent, or Firm—Oblon, Fisher, Spivak, McClelland & Maier

[57] ABSTRACT

A tape cassette reel comprises a special clamp which is fitted to a groove of a hub. The clamp comprises an upper rib, a pair of legs extended from the upper rib; a lower rib inserted between the legs and a projected part formed on the lower rib. The projected part is fitted to a cavity formed at the bottom of the groove of the hub. A tape is completely clamped on the hub by the clamp without failure.

3 Claims, 3 Drawing Figures

TAPE CASSETTE REEL

BACKGROUND OF THE INVENTION

1. Field of the Invention

The present invention relates to a tape cassette reel.

2. Description of the Prior Art

In general, tape cassette reels have structures that a magnetic tape is wound around a hub. In order to wind the magnetic tape around the hub, it is necessary to clamp one end of the tape on the hub.

Referring to FIG. 1, a video tape cassette reel will be illustrated.

In FIG. 1, a tape (not shown) is inserted in a groove (3) of the hub (2) having a lower flange (1) at one end of the hub and a clamp (4) having a sectional view of U-shape is fitted to the groove and an end stopper (5) is inserted into the clamp (4). An upper flange (6) is disposed to the opposite side of the hub (2) to the end connecting to the lower flange (1).

In the conventional tape cassette reel, it is necessary to insert the end stopper into the clamp in order to clamp the tape on the hub whereby the numbers of the parts required for forming the reel are increased to decrease the assemble processibility. Sometimes, a clamping of the tape is released because of failure of inserting the end stopper into the clamp. This causes the trouble of a possible accident.

SUMMARY OF THE INVENTION

It is an object of the present invention to overcome the above-mentioned disadvantages and to provide a tape cassette reel which clamps a tape without such trouble by a simple manner.

The foregoing object of the present invention has been attained by providing a tape cassette reel which comprises; a clamp comprising an upper rib; a pair of legs extended from both ends of the upper rib; a lower rib which is fitted between the legs; and a projected part formed on the lower rib; and said clamp being fitted to a groove of a hub so as to fit said projected part formed on the lower rib to a cavity formed on the bottom of the groove.

DETAILED DESCRIPTION OF THE PREFERRED EMBODIMENTS

Figure 1:
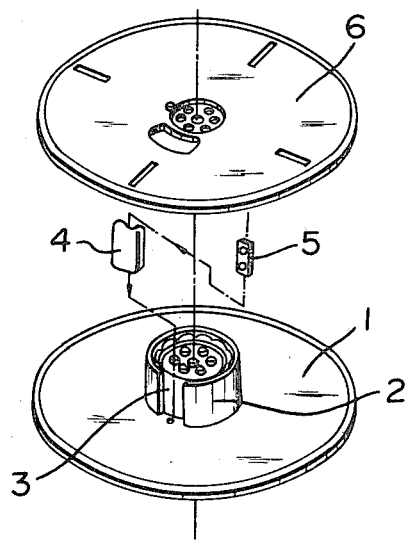
FIG. 1 is a schematic view of the conventional tape cassette reel.

A more complete appreciation of the present invention will be readily obtained as the same becomes better understood by reference to the following detailed description when considered in connection with the accompanying drawings.

Referring to the drawings wherein like reference numerals designate identical or corresponding parts throughout the views.

Figure 2:
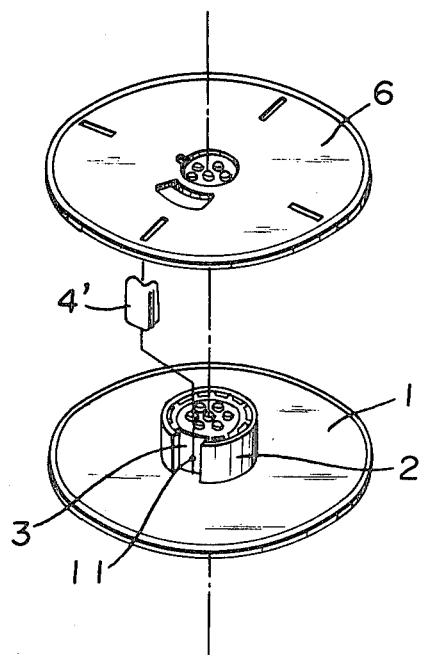
FIG. 2 is a schematic view of one embodiment of a tape cassette reel according to the present invention.

In FIG. 2, the tape (not shown) is inserted in the groove (3) of the hub (2) having a lower flange (1) at one end of the hub and the clamp (4') is fitted to the groove.

Figure 3:
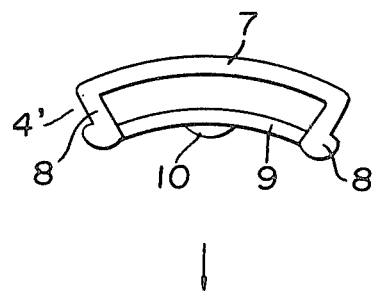
FIG. 3 is a partially enlarged view of the clamp of FIG. 2.
Figure 3:
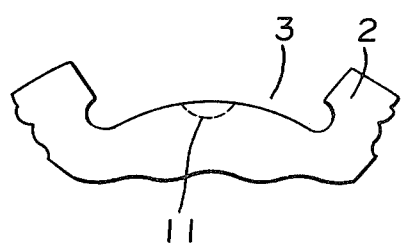

The clamp (4') comprises an upper rib (7) and a pair of legs (8), (8) extended from both ends of the rib (7) as shown in FIG. 3 and a lower rib (9) which is fitted between the legs (8), (8). A projected part (10) in a semi-spherical shape is formed at substantially central part of the lower rib in the side opposite to the upper rib (7). Incidentally, the height of the lower rib (9) (direction perpendicular to the sheet) is lower than the height of the upper rib (7) as is clear from FIG. 2 and the lower rib (9) can be elastically bent. A cavity (11) having a semi-spherical shape is formed at the bottom of the hub (2) and it is fitted to the projected part (10) of the clamp (4') whereby the clamp (4') is completely fitted to the groove (3) of the hub (2) without easily releasing.

The shape of the clamp can be modified as desired so as to fit the clamp (4') to the groove (3) of the hub (2).

It is preferable to have each hook on each leg extended from the upper rib and to have each recess on the groove corresponding to the hook.

The shape of the projected part on the lower rib and the cavity on the bottom of the groove can be various shape and are not limited to the semi-spherical shape, since the projected part and the cavity have the function to firmly clamp the tape without failure. Accordingly, the shape can be modified as desired.

The clamp is preferably completely fitted in the groove of the hub to form a complete cylindrical shape of the hub so as to wind the tape without trouble.

What is claimed as new and desired to be secured by Letters Patent of the United States is:

1. A tape cassette reel assembly comprising:
    a hub having a groove portion including a cavity formed on the bottom of the groove portion;
    a clamp for fitting to said groove portion of said hub and for clamping a tape thereto, said clamp including a first rib member;
    a pair of legs extended from both ends of the first rib member;
    a second rib member which is fitted between the legs; and
    a projected part formed on the second rib member;
    said clamp being fitted to said groove portion of said hub so as to fit said projected part formed on the second rib member to said cavity formed on the bottom of the groove portion of the hub wherein said groove portion includes a first and second recess portion and said legs extending from the first rib member each have a hook portion which is fitted to said recesses in said groove portion of the hub.

2. A tape cassette reel assembly according to claim 1 wherein said second rib member is flexible so as to be easily inserted between the legs.

3. a tape cassette reel assembly according to claim 1 wherein the height of the second rib member is less than the height of the first rib member.

* * * * *